(12) United States Patent
Palmer-Smith

(10) Patent No.: US 9,921,308 B2
(45) Date of Patent: Mar. 20, 2018

(54) GENERATING A MAP CONVEYING THE PROBABILITY OF DETECTING TERRESTRIAL TARGETS

(71) Applicant: Northrop Grumman Systems Corporation, Falls Church, VA (US)

(72) Inventor: James Palmer-Smith, Indialantic, FL (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 357 days.

(21) Appl. No.: 14/754,833

(22) Filed: Jun. 30, 2015

(65) Prior Publication Data

US 2017/0003388 A1   Jan. 5, 2017

(51) Int. Cl.
| | | |
|---|---|---|
| *G01S 13/89* | (2006.01) | |
| *G01S 7/06* | (2006.01) | |
| *G01S 7/22* | (2006.01) | |
| *G01S 13/524* | (2006.01) | |

(52) U.S. Cl.
CPC .............. *G01S 13/89* (2013.01); *G01S 7/062* (2013.01); *G01S 7/22* (2013.01); *G01S 13/524* (2013.01)

(58) Field of Classification Search
CPC . G01S 13/89; G01S 7/062; G01S 7/22; G01S 13/524
USPC .......................................................... 342/179
See application file for complete search history.

(56) References Cited

U.S. PATENT DOCUMENTS

| | | | | |
|---|---|---|---|---|
| 4,970,682 A | * | 11/1990 | Beckwith, Jr. ......... | G06T 15/005 |
| 5,745,073 A | * | 4/1998 | Tomita ...................... | G01S 7/22 |
| | | | | 342/176 |
| 5,828,332 A | * | 10/1998 | Frederick .................. | G01S 7/22 |
| | | | | 342/179 |

(Continued)

OTHER PUBLICATIONS

Makhoul, E. et al; Fast Simulation Performance Evaluation of Spaceborne SAR-GMTI Missions for Maritime Applications; EUSAR 2014; 10th European Conference on Synthetic Aperture Radar; Proceedings of , pp. 682-685; Jun. 2014; ISBN 978-3-8007-3607-2/ISSN2197-4403; VDE Verlag GMBH—Berlin—Offenbach, Germany.

(Continued)

*Primary Examiner* — Frank J McGue
(74) *Attorney, Agent, or Firm* — Patti & Malvone Law Group, LLC

(57) ABSTRACT

An exemplary computer implemented digital image processing method conveys probabilities of detecting terrestrial targets from an observation aircraft. Input data defining an observation aircraft route relative to the geographical map with lines of communications (LOC) disposed thereon are received and stored as well as input data associated an aircraft sensor's targeting capabilities and attributes related to the capability of targets to be detected. Percentages of time for line-of-sight visibility from the aircraft of segments of LOC segments are determined. Probability percentages that the sensor would detect a terrestrial target on the segments are determined. The segments are color-coded with visibility and sensor detection information. A visual representation of the map with the color-coded segments is provided to enhance the ability to select appropriate observation mission factors to achieve a successful observation mission.

6 Claims, 11 Drawing Sheets

(4 of 11 Drawing Sheet(s) Filed in Color)

(56) References Cited

U.S. PATENT DOCUMENTS

| | | | |
|---|---|---|---|
| 6,937,746 B2 | 8/2005 | Schwartz | |
| 7,081,849 B2 | 7/2006 | Collins et al. | |
| 7,583,818 B2 * | 9/2009 | Hegedus | G08G 1/0104 382/104 |
| 8,229,163 B2 | 7/2012 | Coleman et al. | |
| 8,330,647 B2 | 12/2012 | Fox et al. | |
| 8,666,114 B2 | 3/2014 | Schloegel et al. | |
| 8,958,980 B2 * | 2/2015 | Miksa | G06F 17/30241 345/679 |
| 2008/0118104 A1 | 5/2008 | Ariyur et al. | |
| 2010/0157055 A1 | 6/2010 | Pechatnikov | |
| 2011/0029234 A1 | 2/2011 | Desai et al. | |

OTHER PUBLICATIONS

Delmarco, S.P. et al; Modeling Radar Probability of Detection for a Randomly-Located Mover on an Arbitrary Road Network, Systems Journal, IEEE, vol. PP, No. 99, pp. 1-10; Published May 26, 2014.

Gierull, C.H. et al; Two-Step Detector for RADARSAT-2's Experimental GMTI Mode; Geoscience and Remote Sensing, IEEE Transactions on, vol. 51, No. 1, pp. 436-454; Jan. 2013.

Mertens, M. et al; Ground Moving Target Tracking with Context Information and a Refined Sensor Model; 11th International Conference on Information Fusion, Cologne, Germany, Jun. 30-Jul. 3, 2008; pp. 1497-1504.

Hernandez, M. et al; Performance Measures and MHT for Tracking Move-Stop-Move Targets with MTI Sensors; Aerospace and Electronic Systems, IEEE Transactions on, vol. 47, No. 2; pp. 996-1025; Apr. 2011.

Schaefer, C. et al; Analysis of Potential GMTI Performance of TanDEM-X; Synthetic Aperture Radar (EUSAR) 2008 7th European Conference on, pp. 1-4; Jun. 2-5, 2008.

Khatib, E. et al; Space-Time Adaptive Processing Using Pattern Classification; Signal Processing, IEEE Transactions on , vol. PP, No. 99; pp. 1-15.

Kirubarajan, T. et al; Topography-based VS-IMM estimator for large-scale ground target tracking; Target Tracking: Algorithms and Applications (Ref. No. 1999/090, 1999/215), IEE Colloquium on, pp. 11/1-11/4, 1999.

* cited by examiner

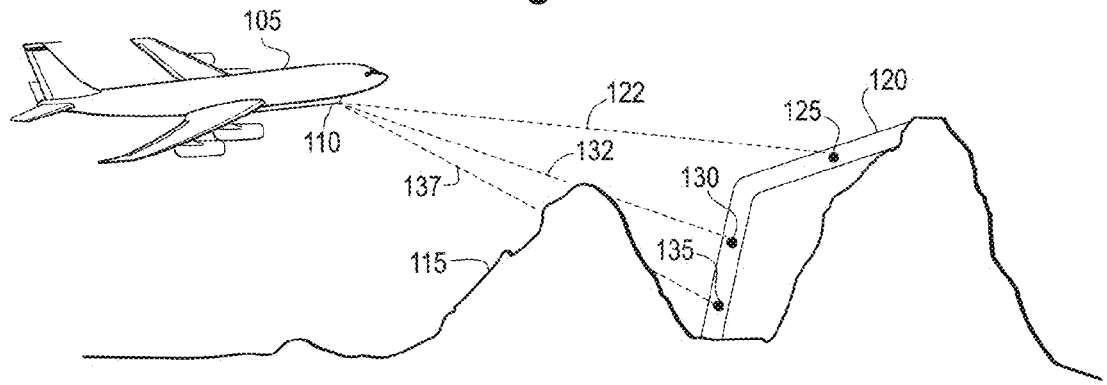
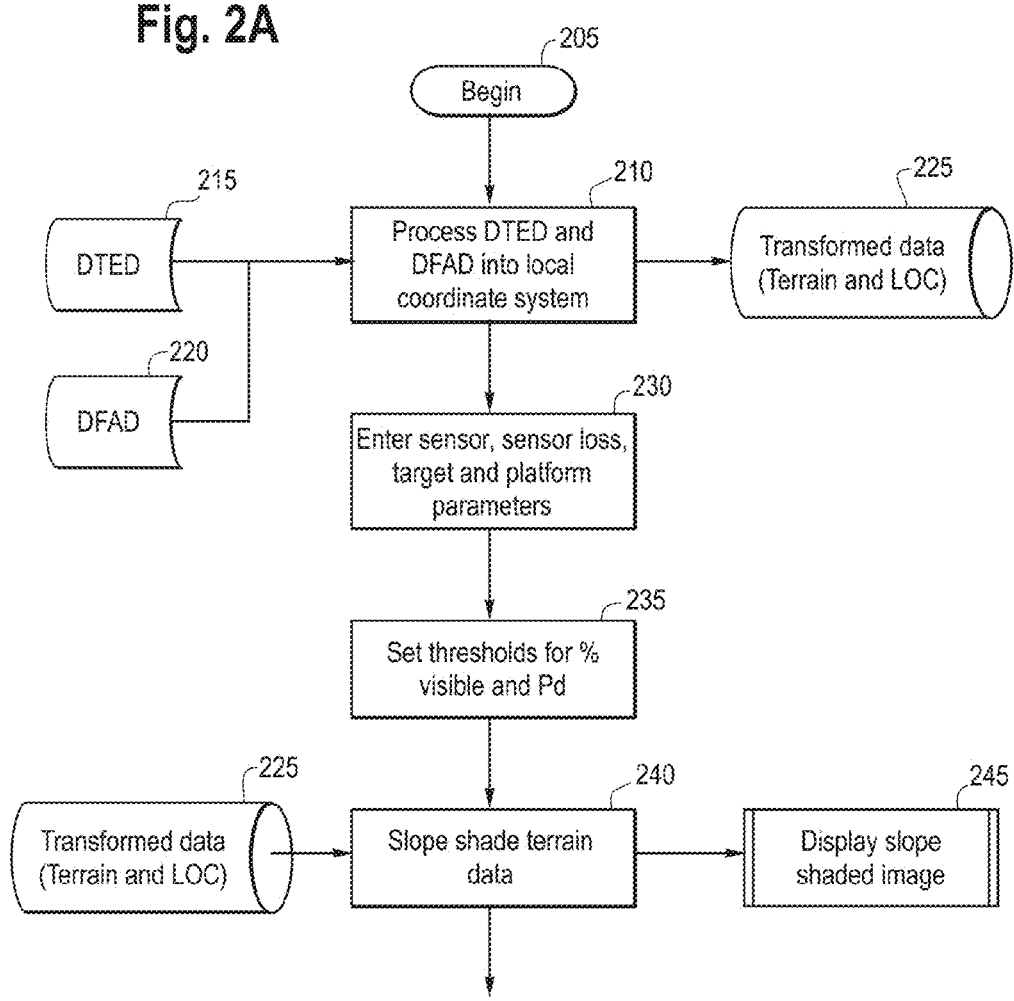

Fig. 4

| Sensor Parameters | Loss Parameters | Target Parameters | Platform Geometry |

Xmit Power (dBW) 41.10   Xmit Gain (dBW) 44.00   Thermal Noise (dB/Hz) -204.00
Rx Gain (dBW) 39.00   Processing Gain (dBW) 3.80   Doppler Filter 0.75
Duty Factor 0.2000   Single CPI Pfa 1.00E-4   Wavelength (m) 0.03

| Sensor Parameters | Loss Parameters | Target Parameters | Platform Geometry |

Scan Angle (deg) 60.00   Atmospheric Loss 3.00
Elevation Pattern Loss 0.00   Beam Spacing 0.00
Lens Loss 0.00   Receive Chain Loss 6.00

| Sensor Parameters | Loss Parameters | Target Parameters | Platform Geometry |

RCS (sq m) 10.00   Heading 0.00   Speed (mph) 25.00
Acc 0.00   Alpha 3.00   Floor 0.50
MDV (m/sec) 2.00   Density 0.00

| Sensor Parameters | Loss Parameters | Target Parameters | Platform Geometry |

Altitude (ft) 36000.00   Heading 0.00   Velocity (knots) 450.000
Min Range (Km) 60.00

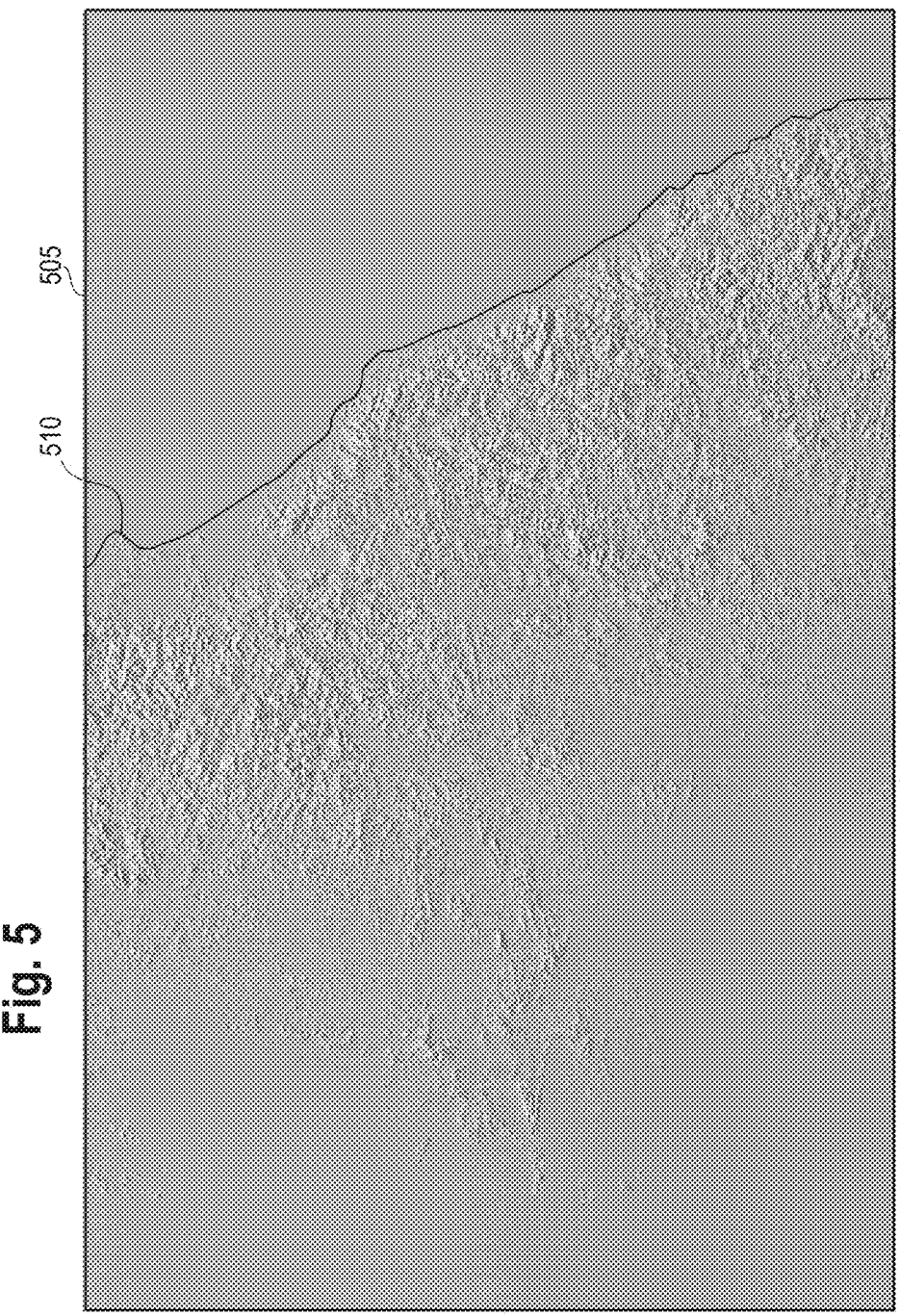

GENERATING A MAP CONVEYING THE PROBABILITY OF DETECTING TERRESTRIAL TARGETS

BACKGROUND

This invention relates to discerning terrestrial targets from the perspective of an aircraft. The invention more specifically relates to digital processing of factors related to target detection by a sensor on an in-flight aircraft and a map of a terrestrial area of interest to generate a visual representation of the probability that earth-based targets will be detectable on segments of lines of communication by the aircraft sensor.

Various techniques exist to detect earth-based targets at a geographic location or on a pathway, roadway or waterway from an in-flight aircraft. For example, high resolution cameras and other sensors, e.g., infrared sensors, radar, etc., may be used to determine if an earth-based target is present at a particular location. Assuming that the aircraft sensor is within its targeting range, atmospheric conditions are acceptable, and a direct line of sight is present between the aircraft and the terrestrial target, it generally follows that the target is likely to be detected. However, a variety of practical considerations complicate the determination of whether a target can be determined to be present. For example, the altitude of the aircraft can significantly affect this determination. Although higher altitudes provide more direct lines of sight over more terrestrial surface area, higher altitudes also mean the sensors used for targeting must operate at a greater distance from the area of interest. This brings into question whether the sensitivity of the sensor is sufficient at the larger distances (higher altitudes) to be able to identify the presence of a target with sufficient probability.

Additionally, the presence of certain geographic features, e.g., mountains, may inhibit a direct line of sight between the airborne sensor and potential target locations depending on the location of the aircraft and area of interest relative to the mountain. Since roadways and/or waterways in mountainous regions are often located at or near valleys, the visibility of these are a function of the position of the aircraft relative to mountain peaks adjacent the valleys.

For an airborne observation mission to increase the probability of success of being able to detect a target, it would be desirable to predict in advance of the mission the probabilities of target detection for particular areas of interest, e.g., particular segments of roadways/waterways. Thus, there exists a need to determine, prior to carrying out an observation mission which can be very expensive, the probabilities of target detection by an aircraft for different factors impacting detection possibilities and provide this information in a form easily understood so that a mission planner can adjust the factors to increase the odds of successfully detecting the presence of targets.

SUMMARY

It is an object of the present invention to satisfy this need.

An exemplary computer implemented digital image processing method conveys probabilities of detecting terrestrial targets from an observation aircraft. Input data defining an observation aircraft route relative to the geographical map with lines of communications (LOC) disposed thereon are received and stored as well as input data associated with an aircraft sensor's targeting capabilities and attributes related to the capability of targets to be detected. Percentages of time for line-of-sight visibility from the aircraft of segments of LOC segments are determined. Probability percentages that the sensor would detect a terrestrial target on the segments are determined. The segments are color-coded with visibility and sensor detection information. A visual representation of the map with the color-coded segments is provided to enhance the ability to select appropriate observation mission factors to increase the probability of achieving a successful observation mission.

In another embodiment, a computer is used to implement these steps.

In a further embodiment, a computer implemented digital image processing method conveys probabilities of observing lines of communication from an in-flight aircraft. A geographical terrestrial map with lines of communications disposed thereon is generated. Input data defining an aircraft route relative to the geographical map is entered. A determination for segments of the lines of communication is made for the percentage of the total aircraft route that each of the segments will have line-of-sight visibility from the aircraft. The segments are encoded with image differentiation to visually distinguish segments in which the percentage of time that the segment will have line-of-sight visibility from the aircraft is greater than a first predetermined/set percentage value from segments in which the percentage of time that the segment will have line-of-sight visibility from the aircraft is less than the first predetermined percentage value. A visual representation of the map with the image differentiated segments is provided.

DESCRIPTION OF THE DRAWINGS

The patent or application file contains at least one drawing executed in color. Copies of this patent or patent application publication with color drawing(s) will be provided by the Office upon request and payment of the necessary fee.

Features of exemplary implementations of the invention will become apparent from the description, the claims, and the accompanying drawings in which:

FIG. 1 provides a perspective of an aircraft during an observation mission.

FIGS. 2A-2B are a flow diagram showing steps in accordance with an exemplary method of the present invention.

FIG. 4 shows an exemplary screen by which a user inputs values for sensor parameters, loss parameters, target parameters and platform geometry.

FIG. 5 shows an exemplary map displayed on the screen in which sun shading of terrain elevations is shown.

DETAILED DESCRIPTION

Figure 2B:
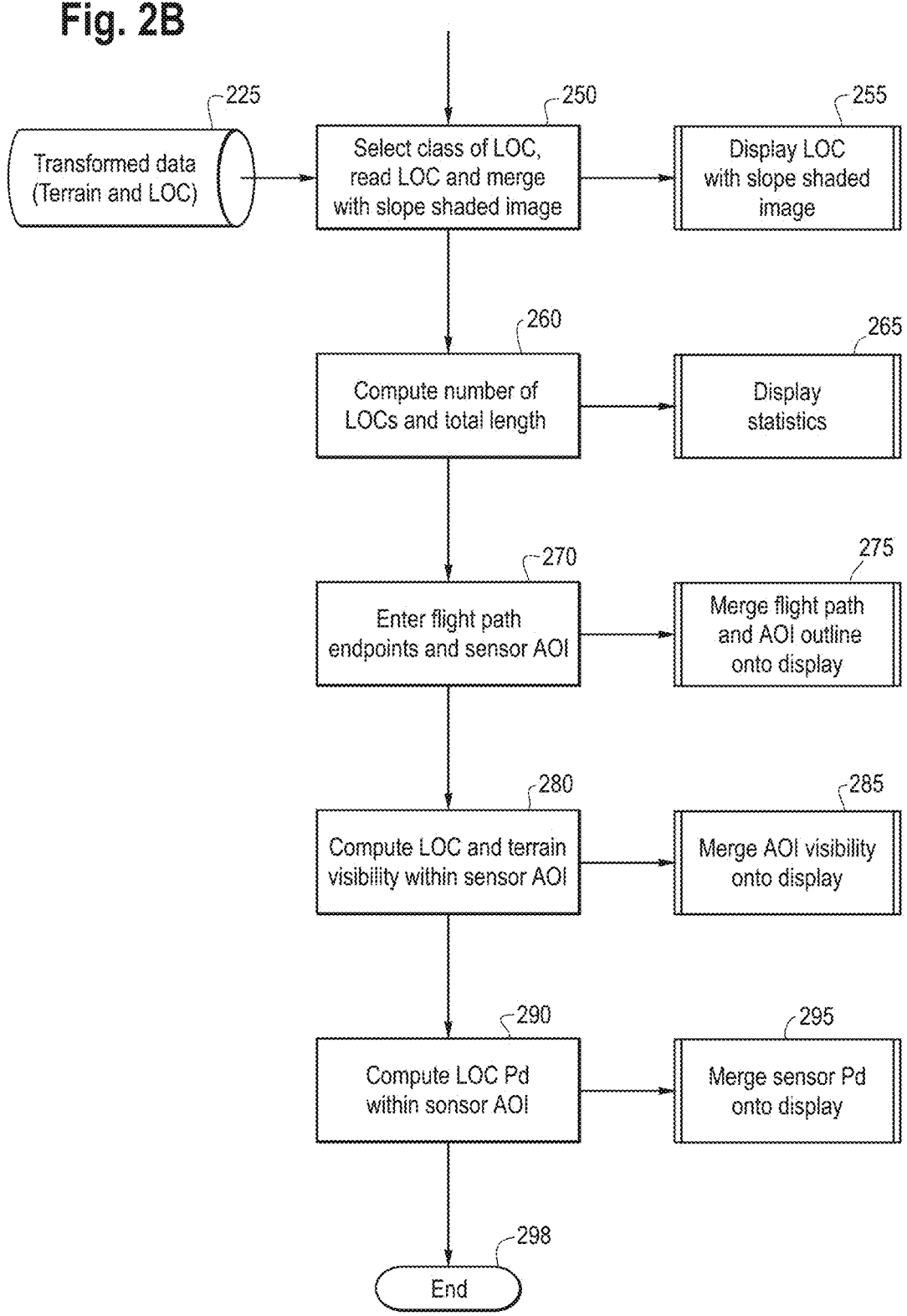

One aspect of the present invention resides in the recognition of the significant difficulties in forecasting how successful of an airborne mission will be in detecting the presence of terrestrial targets on various portions of lines of communication. As used herein "lines of communication" (LOC) refers to routes along which a potential target may travel and includes, but is not limited to, pathways, roadways, waterways and railroad tracks. Assuming that the potential target is a vehicle or person traveling on a line of communication in a mountainous region, a number of factors affect the probability of whether a potential target can be discerned. Some of these factors include: the altitude of the aircraft; the path of the aircraft relative to the area of interest; the lateral distance from the aircraft to the area of interest; the sensitivity of the sensor; the location and height of mountain ridges/peaks relative to the location of the aircraft and roadways/waterways in the area of interest; path of the aircraft relative to the path of the roadway/waterway. The latter factor relates to the use of Doppler radar to discern a moving target since an aircraft route parallel to the roadway/waterway of interest will adversely impact the radar's ability to discern movement of a target traveling parallel to the aircraft and in the same direction. That is, the amount of Doppler shift being relied upon to sense target movement will be reduced by such a situation. The level of LOC visibility and probability of target detection will vary substantially within an area of interest due to the angle of observation by the sensor relative to mountains and target roadways/waterways.

Another aspect of the present invention resides in the recognition that meaningful information to those planning airborne observation missions requires more than merely presenting a table of numerical values. Part of the present invention includes an appreciation that a graphical image of the visibility of lines of communication and/or the probability of successful target detection along these lines of communication will provide mission planners with the ability to easily observe the results of different mission plans having different parameters. This allows the selection of a set of mission parameters that will best satisfy specific mission objectives, e.g., acceptable degree of probability of observing a target on particular LOC segments.

FIG. 1 shows an illustrative example of an observation mission at a particular time during the mission. An aircraft 105 carries a sensor 110 for detecting the presence of potential targets of interest. In this illustrative example, sensor 110 is a Doppler radar unit that is used to scan for targets in the mountainous terrain 115. A line of communication 120, e.g., a roadway, is disposed at least partially in a valley between mountain ridges. There is a direct line of sight 122 between the sensor 110 and target 125 making the detection of this target a high probability since the distance between the sensor and the target is well within the range of the sensor. Because of the position of target 130 relative to the mountain peak and the sensor 110, a direct line of sight 132 between the sensor 110 and target 130 is partially obstructed "shaded" by the mountain, i.e., the probability of detecting target 130 is less than that of detecting target 125 due to signal interference to both the emitted radar signal and the reflection of the signal. Target 135 is positioned along line of communication 120 near the base of the valley so that the mountain ridge totally impedes line of sight 137 between the sensor 110 and the location of target 135. This makes the probability of detecting target 135 at its shown location based on the illustrated position of the aircraft 105 and it sensor 110 near zero. However, if the aircraft 105 continues along a route taking it substantially above the peak of the left mountain ridge, the probability of detecting targets 125, 130 and 135 at the indicated locations becomes very good as a direct line of sight will exist between sensor 110 and each of the targets.

The example represented by FIG. 1 illustrates that visibility and probability of detection will vary depending on the locations on the lines of communication of interest and the location of the aircraft/sensor in view of intervening obstructions, e.g., mountain ridges. For an aircraft flying back and forth between first and second geographical locations, an embodiment of the present invention provides a graphical representation superimposed on a map of the area of interest representing the degree of visibility along segments of lines of communication and/or the probability of detecting a potential target on segments of lines of communication. It is believed that the embodiment of the present invention provides a substantial advance in providing mission planners with a way to more efficiently select aircraft routes and sensors to be deployed in order to increase the probabilities of detection of targets along segments of lines of communication that are of more interest.

FIGS. 2A-2B show exemplary steps in accordance with an illustrative method of the present invention starting with the BEGIN step 205. In step 210 Global Digital Terrain Elevation Data (DTED) and Digital Feature Analysis Data (DFAD) corresponding to a defined mission area are processed into a local coordinate system. This processing is used to transform geodetic coordinates (latitude/longitude/elevation) into Cartesian coordinates (X, Y, Z) such as displayed on a surface map of a portion of the earth. In an illustrative example, the DTED and DFAD data may be obtained from the National Geospatial Intelligence Agency. The geographic information translated into the Cartesian coordinate system by step 210 contains both terrain and lines of communication information, and is stored in memory for later use. As will be apparent to those skilled in the art, step 210 would not be required if the terrain and line of communication information were initially available in the Cartesian coordinate system. One of ordinary skill in the art will appreciate how to translate geographical locations in one coordinate system into a corresponding location in another coordinate system.

Figure 3:
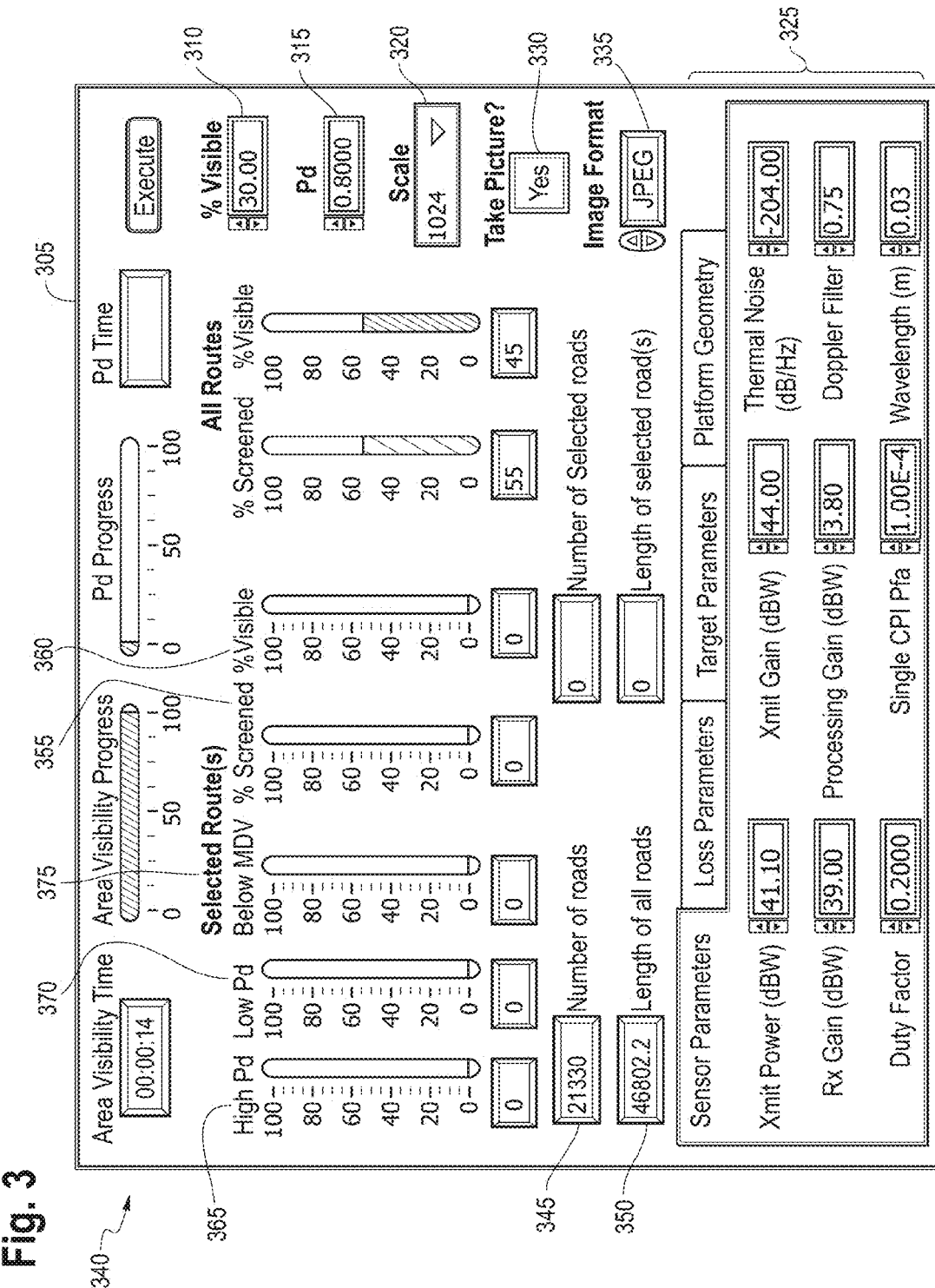
FIG. 3 shows an exemplary screen display of a main input/output window by which input parameter values are entered, and output values and statistics are shown.

In step 230 the user (typically a planner of missions) enters relevant input values for parameters that will have an impact on the visibility and/or probability of target detection on lines of communication that are of interest. An exemplary set of such parameters is shown in FIG. 3 as inputs on a graphical user interface screen in which a Doppler radar sensor will be utilized by an aircraft. A menu of values to be input is displayed in four tabs: tab 305 provides input windows for accepting numerical values for specified sensor (Doppler radar) parameters; tab 310 provides input windows for accepting numerical values for specified loss parameters; tab 315 provides input windows for accepting numerical values for specified target parameters, i.e., parameters associated with targets sought to be detected; tab 320 provides input windows for accepting numerical values for platform geometry parameters, i.e., where the "platform" refers to the aircraft carrying the sensor. It will be apparent to those skilled in the art that the particular value selected for the respective input values will be dependent upon the capabilities of the particular sensor utilized, losses associated with the sensor and due to the environment, target information which will vary dependent on the characteristics of the particular target being sought, e.g., size and potential speed of the vehicle, etc., and the aircraft flight conditions. The values shown are representative for an exemplary mission using a Doppler radar sensor looking for target vehicles during typical flight and atmospheric conditions.

In step 235 the user selects one threshold for the percentage during the entire mission route that lines of communication of interest are visible to the aircraft sensor and another threshold representing a minimum probability of target detection. In this example, the minimum percent visibility of the lines of communication of interest is set to 30% and the probability of detection threshold is set to 80%. Additionally, the user selects the resolution of the display that will show the terrain and lines of communication data on the screen. In this example, the resolution is set to 1024×1024 pixels. This information to be input by the user is similarly displayed by a graphical user interface in corresponding labeled data entry windows into which the corresponding selected numerical values are entered by the user.

In step 240 the terrain and line of communication information in Cartesian coordinates are retrieved from storage 225 and the terrain elevation data for the area of interest is sun shaded to produce a map that conveys topological terrain relief with shades of gray from black to white to increase the understanding of user/planner of the terrain elevations. Any suitable position and angle of the sun may be selected, e.g., the sun may be assumed to be coming from the upper right corner of the map of the area of interest. Further, the shading is preferably normalized and limited to 256 shades of gray although the number of different shades of gray is not critical to providing the user with a terrain elevation perspective. With the sun determined to be at a predetermined location, the elevation of each X-Y coordinate on the map can be compared to the elevations of other X-Y coordinates in a straight line direction towards the upper right corner of the map, i.e., the direction from which rays of sun would be coming. If no other such coordinates have an elevation sufficiently higher than the elevation of the subject X-Y coordinate to intersect a ray of sun coming from the sun's azimuth, then the subject X-Y coordinate will have no sun shading. For example, using geometry based on right triangles, the distance in the X-Y plane between the subject coordinate and each of the other coordinates in the direction of the sun forms the base of the triangle and the distance between the respective elevations forms the height of the triangle. With this information the angle formed between the Z axis value of the subject coordinate and the Z axis values of the other coordinates in the direction of the sun can be computed and compared with the predetermined azimuth of the sun to determine the amount, if any, of interference/blocking of the ray of sun. With this amount determined for each coordinate, the degree of shading (value of gray to be displayed) can be based on normalized values of these amounts. For example, the X-Y coordinate with the maximum amount of interference/blocking can be set to be displayed as black and the X-Y coordinate with the minimum amount of interference can be set to be displayed as white. For X-Y coordinates with amounts of interference between the extremes, each such coordinate can be assigned one of a predetermined number of different shades of gray based on relative amounts of interference. As indicated by step 245 such a sun shaded map illustrating terrain elevations is produced and displayed on a screen for the user.

In step 250 the class or types of lines of communication are selected, e.g., roadways. The lines of communication stored in database 225 are characterized by type so that one or more types of line of communication can be selected by the user. Following the selection, the selected type of lines of communication are read from database 225 and this information is merged with the sun shaded terrain image and displayed on the screen as indicated at step 255.

In step 260 the number of lines of communication and their total length are computed. This information is used in calculating other statistics such as the percent of lines of communication that are visible and the percent of lines of communication that are above a selected probability of detection threshold. In step 265, numerical information is displayed to the user showing values for the number of lines of communication and the total length of all lines of communication. The database 225 contains all of the relevant coordinates for each of the lines of communication and distances can be calculated between coordinates along the line of communication and summed.

In step 270 the user enters the flight path end points representing a straight-line route and the various parameters associated with FIG. 4. In accordance with this example, the user is able to point and click with a mouse on the map to select the flight path end points, and is able to select the subset area of interest on the map to be studied by clicking on the center of the area of interest and the outline of the subset area is drawn on the display. In step 275 a predetermined outline of the subset area of interest is superimposed on the screen which previously displayed information as described with regard to step 255.

In step 280 the visibility of the lines of communication are computed in the specified subset area of interest to be scanned by the sensor, i.e., the sensor scan area of interest has been selected by the user and is shown as an inset area on the map. The displayed subset map is updated at step 285 for visibility of the segments of the LOC and sun shading of the terrain elevations in accordance with the black, gray, white color coding for the sun shadowing and the blue/red color coding for LOC visibility. That is, segments of lines of communication that are 30% visible are colored blue and portions of lines of communication that are not 30% visible are colored red. For this step, a subset of the LOC can be selected and used for the calculations rather than every road within the area of interest (AOI). For example, if there is a known, well-travelled supply route, this could be singled out and evaluated for best performance. For this example case, all the collected statistics, except for the red/blue (labeled as All Routes), would be presented under the Selected Route(s) label and the green, yellow, magenta, orange and blue sliders would represent the selected route(s) and only the selected route(s) in the image would have the same corresponding colors and rest would remain red/blue.

To calculate the percentage of time visible for the lines of communication, the straight-line route from point X to point Y of the aircraft is divided into a plurality of equally spaced waypoints, e.g., 60 discrete points along the route from X to Y. To determine visibility of a point on a line of communication, 60 separate calculations are made corresponding to each of the 60 discrete points (60 different geographical locations) representing the length of the entirety of the mission. In this example, for a particular point on a line of communication, at least 18 (30%×60) of the 60 calculations must result in line of sight visibility by the aircraft in order to meet the criteria that this point on the line of communication is visible at least 30% of the time of the mission. Of course, a different number of waypoints along the aircraft route could be used for a piecewise linear representation of the entire aircraft route if more or less granularity is required.

A calculation is also made and displayed to the user indicating the percentage for all the displayed lines of communication that are visible for 30% of the time, e.g., 55% of the total of all displayed lines of communication are visible for 30% of the time. This means that the user will see the map with lines of communication color-coded about one half blue and one half red, e.g., 55% and 45%. The visibility of the segments of the lines of communication can be calculated as explained below.

Compute unit vector from points along the lines of communication to the platform (aircraft) at the different waypoints along the route:

$$Dx = Px - Tx0 * Resolution;$$

$$Dy = Py - Ty0 * Resolution;$$

$$Dz = Pz - Tz0;$$

where Di is the distance in the i coordinate between a platform location and a LOC location, Pi is location of the platform at the i coordinate, Ti0 is the starting LOC location of the point at i coordinate, Resolution is the pixel resolution of the displayed subset map (i.e., 250 meters/pixel).

$$Range = sqrt(Dx^{}2 + Dy^{}2 + Dz^{**}2);$$

$$Ux = (Dx/Range);$$

$$Uy = (Dy/Range);$$

$$Uz = (Dz/Range);$$

where Range is the vector magnitude between the platform at a waypoint and the LOC point; Ui is the unit vector magnitude in each of the three coordinate dimensions.

Iterate along a ray from adjacent waypoints of the platform to target by multiplying the unit vector, Ui, by an accumulated counter, Ray, and check if next point is higher than previous. If the subsequent elevation is higher than the previous then the point is visible. If it is less, then the point is screened, not visible. This process is repeated until the extent of the area of interest is completed.

$$Tx = Tx0 + Ux * Ray;$$

$$Ty = Ty0 + Uy * Ray;$$

$$Tz = Tz0 + Uz * Ray * Resolution;$$

$$Rt = Rt0 + Resolution;$$

where Ray is an accumulator in the resolution of the data, i.e., 100 meters/pixel times 1, 2, 3, 4, etc. . . . , Rt is the range to the target, i.e., point being interrogated for visibility, and is used to exit the decision loop when the limit is reached, and Rt0 is the initial range to the target.

In step 290 the probability of detection (Pd) of a target traveling on visible segments of lines of communication is calculated for lines of communication within the subset area of interest, i.e., the displayed AOI subset map. This information is displayed on the AOI subset area of interest map in a color-coded format in which different segments of lines of communication are shown in different colors that match corresponding analog color bars shown in a main input/output window. The color coding will be explained with reference to FIGS. 8 and 9. The probability of detection as implemented in step 290 can be calculated as explained below.

Compute visibility of every coordinate on every LOC segment within the AOI as previously described and then use the radar range equation and compute probability of detection (Pd) for every coordinate along every visible LOC segment from 60 locations along the mission route (orbit) as follows:

MTI Pd Requirements

The application of MTI target statistics is fundamentally related to target signal-to-noise (T/N) as derived from the radar range equation. A baseline T/N ratio is defined in dBm consisting of the radar system gains and losses, from which variable gains and losses based on target geometry and scan conditions may be added. $T/N_0$ consists of values for the peak transmit power (Pt), peak antenna transmit gain (Gt), peak antenna receive gain (Gr), processing gain (Gp), transmit duty factor (Df), wavelength ($\lambda$), thermal noise factor (kT), fixed receive chain losses (Lrcv), and constant terms [2(4π)3=36 dBm].

$$T/N_0 = P_t + G_t + G_r + G_p + 10 \log_{10}(D_f) + 30 \log_{10}(\lambda) - kT - L_{rcv} - 36$$

Lrcv consists of fixed allocated losses such as radome loss, noise figure, matched filter loss, phase noise, SPP noise, Doppler filter taper, Δ PRF (waveform), and average beam pointing loss.

$T/N_0$ is modified based on specific target and scan conditions such as the targets radar cross section (σt), Doppler filter bandwidth (Dbw), target range (Rt), beam broadening loss (Lscn), atmospheric loss (Latm), elevation pattern loss (Lepat), beam spacing (Lco), and lens loss (Llens). Each of these losses is computed based on the geometric relationship of the target to the scan. They are added to the baseline T/N to obtain the following:

$$T/N_t = T/N_0 + \sigma_t - 10 \log_{10}(D_{bw}) - 40 \log_{10}(R_t) - (L_{scn} + L_{atm} + L_{epat} + L_{co} + L_{lens})$$

Other losses which factor into T/Nt such as $^A_D$ quantization loss, filter scalloping loss, pulse loss, and CFAR losses vary according to PRF and Doppler filter are not implemented at this time.

Computations Made Per Dwell

Some radar system losses vary only as the beam scans in azimuth and can be considered the same for all targets within that beam. The beam broadening loss (Lscn) occurs from electronically steering the beam in azimuth, and can be represented by the closed form expression:

$$L_{scn} = -20 \log_{10}(5.67 \cos^{0.5} \theta_s - 2.36 \cos \theta_s - 2.31)$$

where, $\theta_s$: antenna scan angle with respect to boresight (radians)= $\pi - \beta_s$.

$\beta_s$: antenna cone angle with respect to platform heading (radians).

where $\theta_s$ is computed as follows:

$$Et = Tx * \cos(Pio2 - Heading) - Ty * \sin(Pio2 - Heading);$$

$$Nt = Tx * \sin(Pio2 - Heading) + Ty * \cos(Pio2 - Heading);$$

$$Ep = Px * \cos(Pio2 - Heading) - Py * \sin(Pio2 - Heading);$$

$$Np = Px * \sin(Pio2 - Heading) + Py * \cos(Pio2 - Heading);$$

where Et and Nt are the easting and northing coordinates of the target (Cartesian), Ep and Np are the easting and northing coordinates of the platform, Pio2 is Pi divided by 2.

$$\theta_s = a\tan(abs(((Nt-Np)/(Et-Ep))));$$

For those systems that scan electronically in azimuth, the Doppler filter bandwidth (Dbw) and azimuth beam spacing varies as a function of θs. The T/N curves were derived under the assumption that a nominal Dbw and two-way 6 dB beam spacing were used. The actual Dbw can be derived from the number of integrated pulses (Nint) and PRF in the first CPI of the dwell as $$D_{bw} = \lambda PRF/(2N_{int})$$

This term is entered as a constant for this model.

A beam spacing factor (BSf) can be computed to relate the actual beam spacing back to the two-way 6 dB beam spacing. From this factor an additional beam spacing loss (Lco) analogous to the azimuth beam shape loss can be derived as follows:

$$L_{co} = -10\log_{10}(BS_f)\ BS_f = \varphi_d \cos\theta_s/\varphi_b$$

where, $\varphi_d$: Beam spacing for the current dwell (radians)
$\varphi_b$: Two-way 6 dB beam spacing at broadside (radians)

Figure 11:
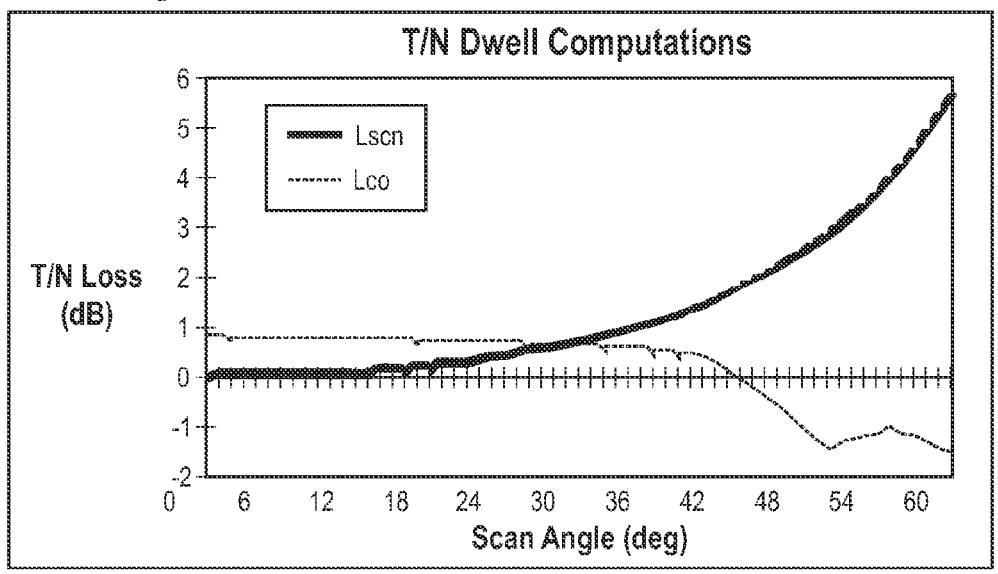
FIG. 11 is a graph showning radar losses for dwell as a function of angle per target.

Typical losses for a dwell as a function of angle per target are shown in FIG. 11.

Computations Made Per Target

Computations made per target are the lowest resolution required for the MTI Pd simulation. The computations made per target are target range (Rt), range rate ($\dot{R}$t), radar cross section (σt), terrain screening, and target resolution.

The loss due to target range is 40 log 10(Rt). Target range is given by:

$$R_t = [(T_x - P_x)^2 + (T_y - P_y)^2 + (T_z - P_z)^2]^{0.5}$$

where,
Ti: Target Position Vector
Pi: Platform Position Vector

Target range rate ($\dot{R}$t: radial velocity) is derived to determine if the target is in a Pd notch due to Doppler ambiguities within the PRF set. Since the Pd dips are considered the same for opening and closing targets, the absolute value of $\dot{R}$t is used.

$$\dot{R}_t = -V_t \cdot (T-P)/R_t,\ V_t\text{: Target Velocity Vector}$$

Micro-Screening

Partial line of sight blockage by trees and other foliage near roadways (sometimes called micro-screening) is more difficult to model but it must be taken into account for reliable MTI performance predictions. In this case, the direction of target motion affects the probability of detection as shown in FIGS. 12 and 13.

Figure 12:
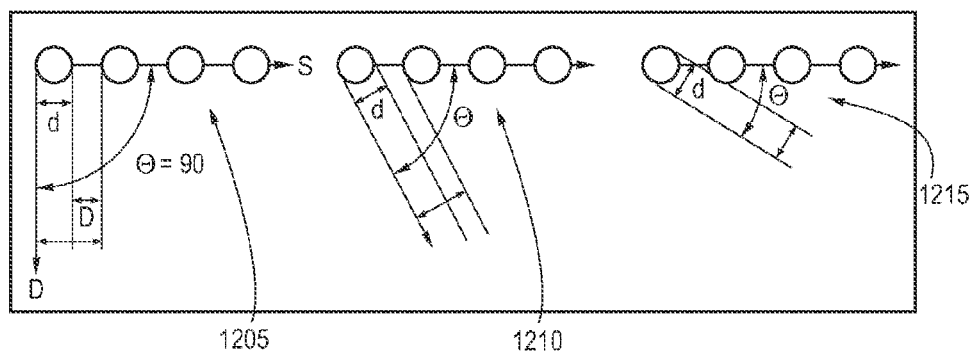
FIG. 12 illustrates micro-screening by trees along a road as seen at different angles and the corresponding loss in a radar signal caused by different angles relative to the trees.

FIG. 12 illustrates a tree lined road and how the micro-screening provided by the trees impacts on the ability of a radar signal to detect a target on the road. In example 1205 the unit lock vector L of the radar signal is broadside to the line of trees indicated by vector S, where d is the diameter of the tree, D is the average separation between trees, and θ is the angle between vector L and vector S. In example 1205, D*sin (θ)=D since the angle is 90°. The radar power loss due to the micro-screening (Pmicro) for example 1205 is d/D. In example 1210 the angle θ has changed such that D*sin(θ)>d resulting in d/D<Pmicro<1. In example 1215 the angle θ has changed such that D*sin(θ)<d resulting in what is referred to as the extinction angle meaning that at this angle the radar beam cannot penetrate between the trees to detect a potential target on the shadowed roadway; in this situation Pmicro=1.

Figure 13:
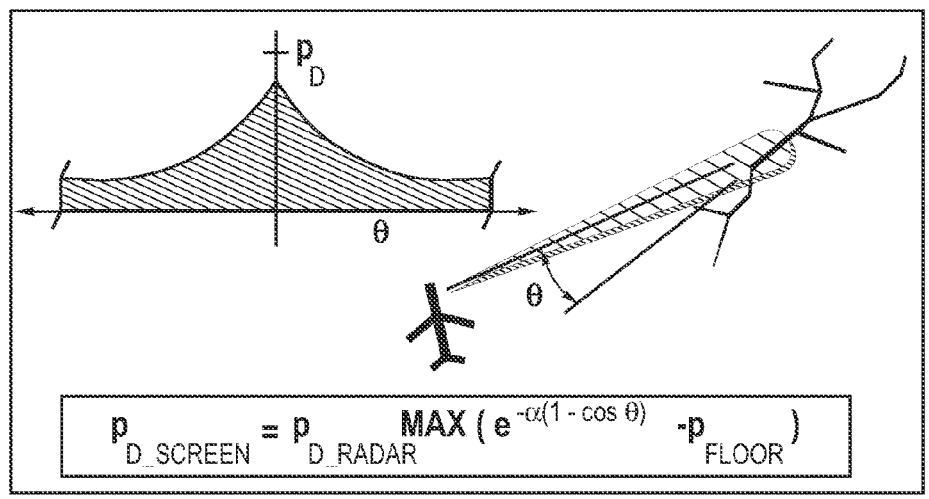
FIG. 13 is a graph showing how micro-screening impacts the probability of detection of a target by a radar signal.

FIG. 13 is a graph showing how micro-screening impacts the probability of detection of a target by a radar signal. In the equation shown in FIG. 13, $P_{D\_screen}$ is the probability of detection where micro-screening is present, $P_{D\_radar}$ is the probability of detection if there were no micro-screening, and $P_{floor}$ is the floor or minimum for a probability of detection.

Careful analysis of live MTI data has produced the model shown in FIG. 13. Parameters of the model are:

$Pd_{floor}$—worst-case probability of detection (e.g., 0.3)
$\alpha_{micro\ screen}$—micro screening constant (e.g., 6)

Or the simpler case can be used when it known that there is limited foliage by setting the Pds equal to 1.

$Pd_{radar}$ is calculated as follows:

$$TN = 10^{**}(T/N_i/10);$$

$$CPI_{Pfa} = \text{sqrt}(P_{fa}/(CPIs^*(CPIs-1)));$$

$$CPI_{Pd} = CPI_{Pfa}^{**}(1.0/(TN+1));$$

$$Pd_{radar} = 6^*CPI_{Pd}^{**}2^*(1.0 - CPI_{Pd})^{**}2 + 4^*CPI_{Pd}^{**}3^* (1 - CPI_{Pd}) + CPI_{Pd}^{*}4;$$

where Pfa is the probability of false alarm and CPIs is the number of coherent processing intervals.

Or the simple case can be used if the radar has not been modeled or characterized sufficiently to account for the number of coherent processing intervals.

$$Pd_{radar} = P_{fa}^{**}(1/(TN+1));$$

Finally, the product of radar Pd ($Pd_{radar}$) and micro screening ($Pd_{screen}$) gives the instantaneous probability of detecting a single MTI target on a single scan of an MTI radar:

$$Pd = Pd_{radar} Pd_{screen}$$

FIG. 3 shows a main input/output window 305 to be displayed on the screen of a monitor in accordance with an embodiment of the present invention. A % visibility window 310 facilitates the input by the user of a minimum percentage value, e.g., 30%, of visibility of lines of communication to be used in later calculations. A probability of detection (Pd) window 315 allows the user to input a minimum percentage value, e.g., 80%, to be used for the probability of detection in later calculations. A window 320 allows the user to input a scale/resolution of the display screen, e.g., 1024, to be utilized for the display of maps and information residing in the maps. A bottom portion 325 of this window allows for the user selection and display of one of 4 tabs, where each tab corresponds to a subset screen portion providing the user with a plurality of inputs of parameter values associated with the subject matter of each tab. This will be explained in more detail with regard to FIG. 4. A yes/no button 330 provides the user with the opportunity to specify whether or not a picture of the ultimately rendered map should be taken. The window 335 provides an input whereby the user can specify the file format of the image of the map, e.g., JPEG.

A plurality of output windows 340 are disposed along the top row of the main input/output window 305. The area visibility time window shows an output of the time while computing visibility of the lines of communication. The area visibility progress horizontal slider and the probability of detection horizontal slider provide an analog update to the user of the progress in computing these parameters. The probability of detection time window shows an output of the time required to compute and generate a corresponding display output of the probability of detection. An "execute" button provides the user with an input to cause the start of calculations. A window 345 displays an output value associated with the number of roads/LOC in the entire area of interest and window 350 displays an output value of the total length of all the roads/LOC. Two corresponding windows to the right of window 345 and 350 refer to corresponding values of only selected roads/LOC in the AOI subset map.

A plurality of vertical analog sliders, each with a corresponding color code, provide outputs to the user indicating a percentage between 0% and 100% for corresponding parameters. The left 5 sliders provide information related to the selected routes, i.e., roads/LOC in the AOI subset map. The right 2 sliders provide information related to all routes, i.e., roads/LOC in the entirety of the map. The left vertical slider "High Pd" 365 shows the percentage of selected routes having a probability of detection above the input threshold probability value and the next slider "Low Pd" 370 shows the percentage of selected routes having a probability of detection below the selected threshold value. The third vertical slider "Below MDV" 375 shows the percentage of selected routes that are below the Minimum Detectable Velocity, i.e., all radars have an MDV and the value set on the input sensor parameters (step 230 tab 305) is compared to the value at each point on the LOC and statistics collected. The slider 355 for "% Screened" indicates the percentage of selected routes that are below the input percent visible threshold value of window 310. The slider 364 "% Visible" indicates the percentage of selected routes that are above the percent visible threshold value.

FIG. 4 shows each of the 4 tabs 325 as shown in FIG. 3 simultaneously expanded in a window 400. As shown in FIG. 3, in normal operation only one tab as selected by a user would be displayed on the screen 305 at a given time. Tab 405 provides the user with a plurality of windows into which values are entered representing various sensor parameters for the particular sensor to be utilized during the mission. In this example Doppler radar is utilized as the sensor and a plurality of labeled radar parameters and representative values are shown. Tab 410 provides the user with windows to insert various loss parameter values, i.e., values associated with factors that will reduce the range of the sensor. Tab 415 provides the user with windows to insert various parameter values associated with targets to be detected, i.e., factors associated with movement or attributes of targets that will have an impact on the ability to detect the targets. Tab 420 provides the user with windows to insert values associated with the platform (aircraft) that will have an impact on the visibility of the lines of communication and/or the ability to detect targets. As will be apparent to those skilled in the art, the particular values to be entered by the user will depend on the particular sensor utilized, loss factors associated with the sensor and environmental conditions, parameters associated with different types of targets, and the flight plan specified for the aircraft and the range over which the sensor is to scan.

FIG. 5 shows an exemplary map 505 displayed on the screen in which sun shaded terrain elevations are shown. In accordance with this example, sunlight is assumed to be coming from the upper right corner of the illustrated map 505. It will be noted that to the right of line 510 no terrain shadowing exists. In this example the area to the right of line 510 consists of a body of water for which there is no sun shadowing. Land to the left of line 510 includes a mountainous range for which sun shading is applied to provide a perspective of terrain elevation. Although 256 shades of gray between black and white were utilized to illustrate sun angle shading in this example, the number of gradations of gray utilized is not critical. It is preferred, but not required, that the user be provided with some indication of topological terrain.

Figure 6:
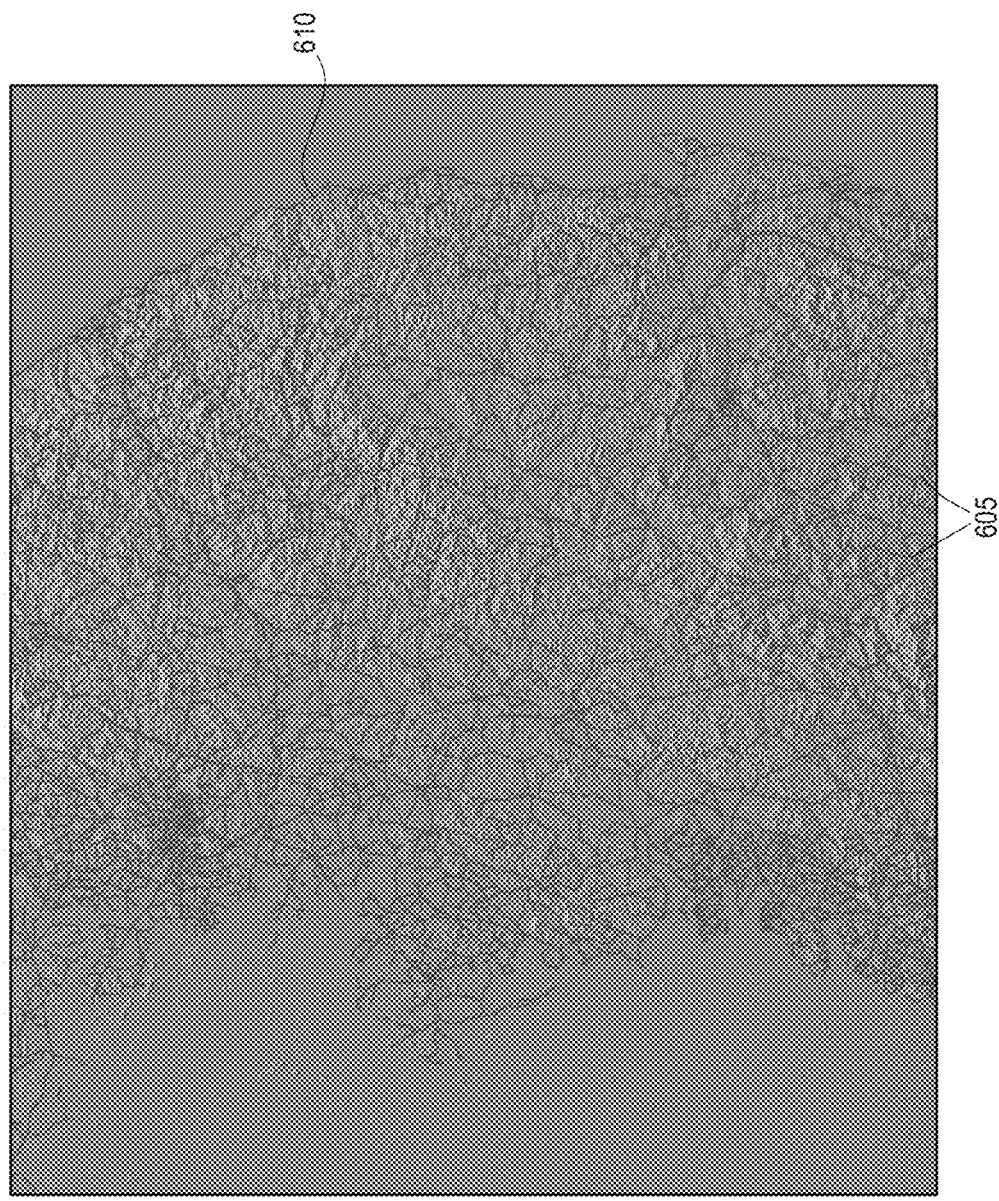
FIG. 6 shows an overlay of lines of communication shown on the map of FIG. 5.

FIG. 6 shows an overlay of lines of communication on the map of FIG. 5. In this illustrative example, the lines of communication are represented by lines that are a blue-green color, e.g., lines 605. It will be noted that the map as illustrated in FIG. 5 is not shown in the same exact registration as the map as shown in FIG. 6. The rightmost lines of communication in FIG. 6 represent roads 610 along the coastal edge of the landmass for the body of water defined by line 510. As previously explained with regard to step 250, these lines of communication are extracted from the database 225 and are applied in registration with the shaded terrain elevation map previously generated by step 240.

Figure 7:
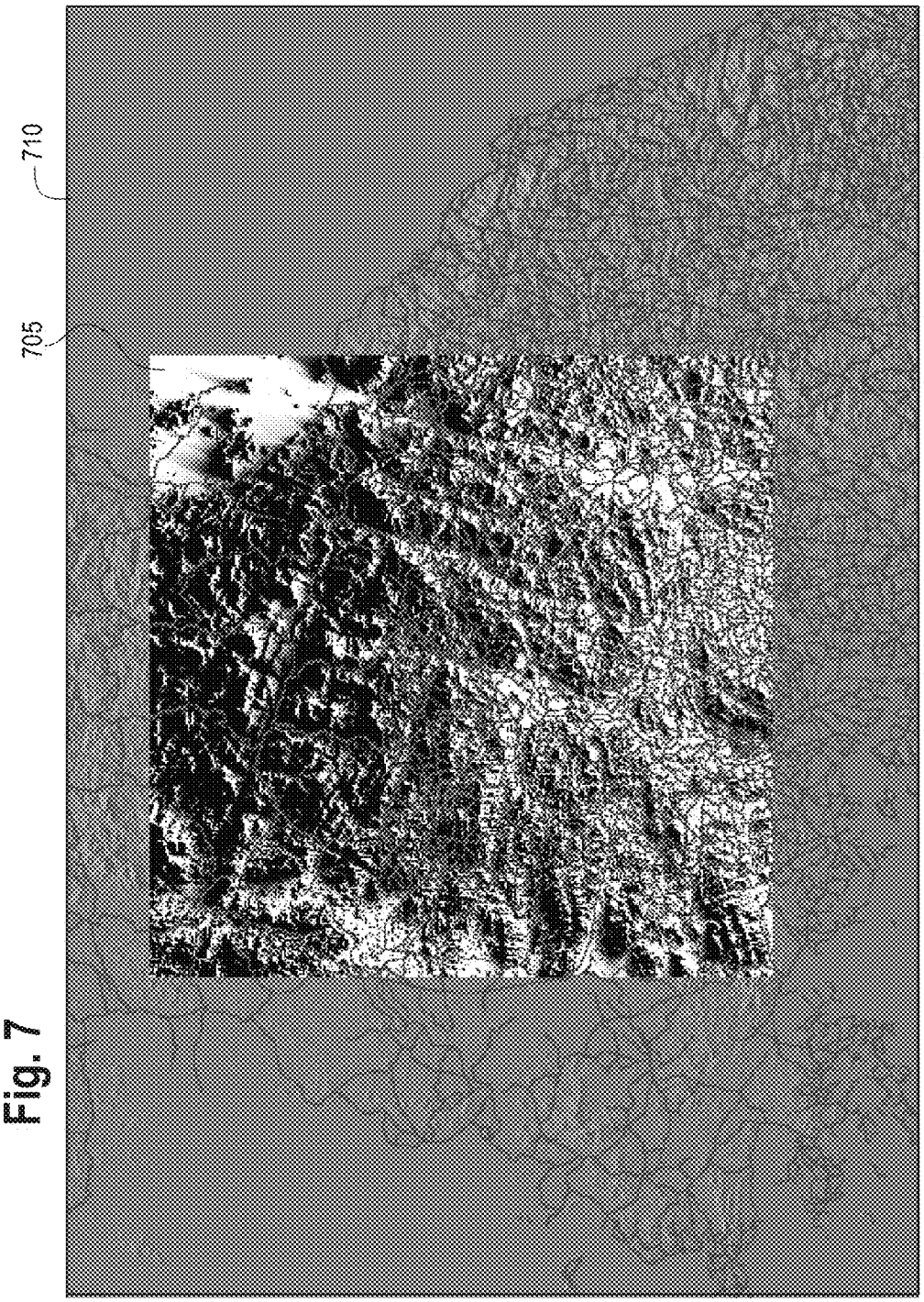
FIG. 7 shows color coding of the lines of communication of FIG. 6 within an inset area of interest portion where the color coding conveys lines of communication that are visible for a mission route for at least a specified percentage of time.

FIG. 7 shows color coding of the lines of communication of FIG. 6 within the selected area of interest 705 where the color coding identifies segments of lines of communication that are visible during a mission route for at least the specified percentage of time, i.e., 30% in this example was selected by the user. In this example, 55% of the lines of communication are visible for 30% or more during one traverse of the entire mission route. Thus, the rightmost vertical slider "% visible" in FIG. 3 would be blue to match the visible coloring on the map of the lines of communication and would show a value of 55, while the adjacent vertical slider "% screened" in FIG. 3 would be red to match the screened coloring on the map of the lines of communication and would show a value of 45. For the remainder of the map 710 outside of the AOI, the lines of communication will retain the blue-green color.

Figure 8:
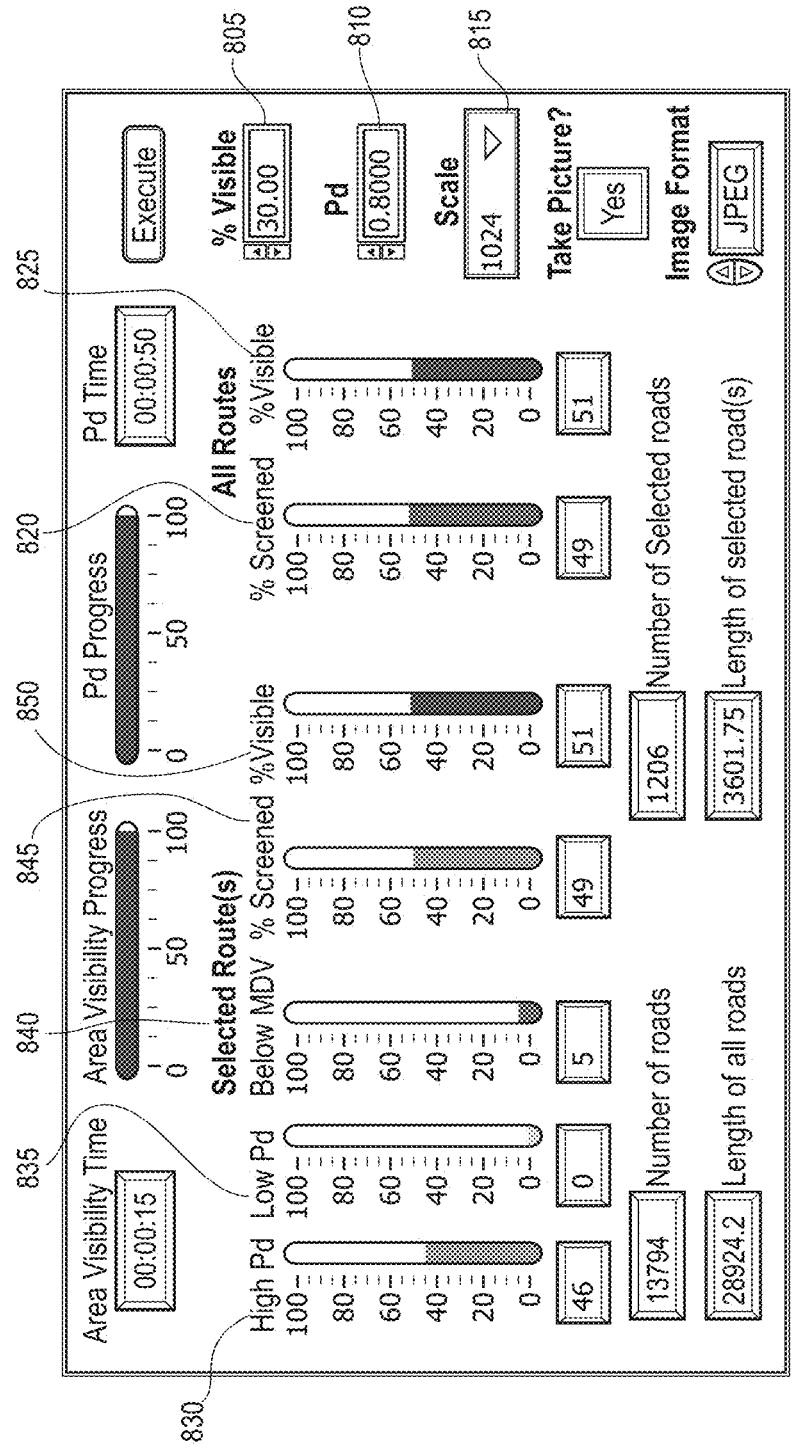
FIG. 8 is similar to FIG. 3 but with values shown at the completion of a targeting analysis.

FIG. 8 is similar to FIG. 3 but with values shown following the completion of an analysis. In this example, the % visible value at window 805 has been set to 30%, the Pd value at window 810 has been set to 80%, and the scale at window 815 has been set to 1024 pixel resolution. The top row information indicates that the Area Visibility Progress and Pd progress sliders have 100% completed, that is, it required 15 seconds to compute the area visibility, and a total 50 seconds to compute both the visibility and the probability of detection information. The vertical sliders under ALL ROUTES for % screened 820 (red) and % visible 825 (blue) show values of 49 and 51, respectively. This represents that 51% of all routes are visible for at least 30% of the mission route and that 49% of all routes are not visible/screened for at least 30% of the mission route. There were 13,794 total roads having a total length of 28,924.2 km and 1,206 roads with a total length of 3601.75 km within the selected AOI (as determined in step 280).

Figure 9:
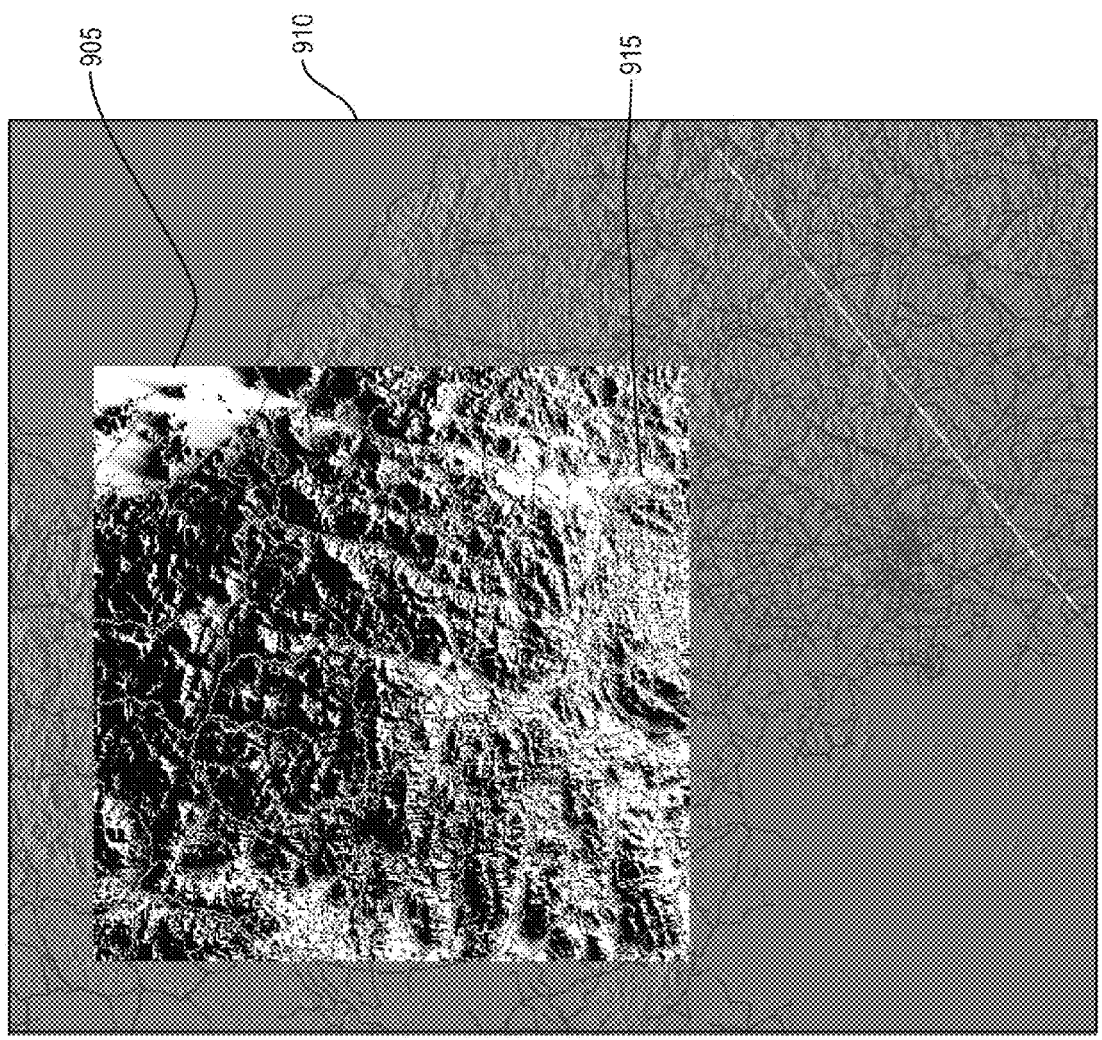
FIG. 9 shows the display of the map of FIG. 7 in which segments of lines of communication are color-coded to match the colors of corresponding data in the main input/output window as shown in FIG. 8.

Information shown for the Selected Route(s) applies in color coded correspondence to the AOI map portion 905 of the overall map 910 shown in FIG. 9. The High Pd vertical slider 830 (green) has a value of 45 representing that 45% of the visible lines of communication in the AOI map section have a probability of detection of 80% or greater. The Low Pd slider 835 (yellow) has a value of zero representing that none of the visible lines of communication have a probability of detection lower than 80%. The Below MDV slider 840 (magenta) has a value of 5 representing a 5% probability that a target moving at a velocity within the specified range on a visible line of communication would still not be detected. As noted earlier, the performance of radar operating on the Doppler principle degrades if the radar unit is moving in a direction substantially parallel to and having a similar heading to that of a potential target. As seen from the AOI map portion 905, a representative segment 915 of a visible line of communication is colored magenta. Looking at the various visible segments of the lines of communication colored magenta, one will discern that the magenta segments are generally parallel to each other running approximately 45° to an X-Y axis where the bottom left corner of the AOI map portion is the origin. One can infer from this pattern of magenta line segments that the aircraft heading for this trial mission plan was approximately parallel to these magenta lines.

The % Screened slider 845 (orange) has a value of 49 representing that 49% of the selected routes are screened/not visible and the % Visible slider 850 (blue) has a value of 51 representing 51% of the selected routes are visible. It will be noted that the AOI map portion in FIG. 9 does not show any lines of communication colored red/blue. This is because all the LOC were selected for the AOI. If a subset had been selected, only those LOC would be represented in the slider colors and the rest would be red/blue. Also, it is deemed more important to present to the user the information associated with sliders 830, 835 and 840 on the visible segments of the lines of communication on the AOI portion of the map as each of these parameters are all applicable only to visible lines of communication. The sum of the values of these three sliders is 50 which is approximately equal to the 51% Visible value, taking computational variation and rounding into consideration.

FIG. 9 shows the display of the map of FIG. 7 in which the lines of communication are further color-coded to match the colors of certain sliders in the main input/output window as shown in FIG. 8. The lines of communication/roads in the top half and central mountain region of AOI map 905 are displayed in orange representing that these roads are not visible for the parameters entered for the trial mission plan. The central mountain region is apparent based on the sun shading, i.e., relatively large areas of black or dark gray. Approximately the bottom third of the AOI map 905 shows a less mountainous region as indicated by the relatively large areas of white or light gray. Many of the roads in the bottom third of the map are visible as indicated by magenta and green colored road segments. Although color coding provides an effective way of differentiating segments of the lines of communication with different attributes of interest, other visual characteristics could be utilized to convey the different attributes. For example, segments could be represented with different line widths, different shading or cross-hatching, or other forms of image differentiation. As used herein, "image differentiation" is used to refer to any format for visually conveying different attributes of segments of lines of communication.

Figure 10:
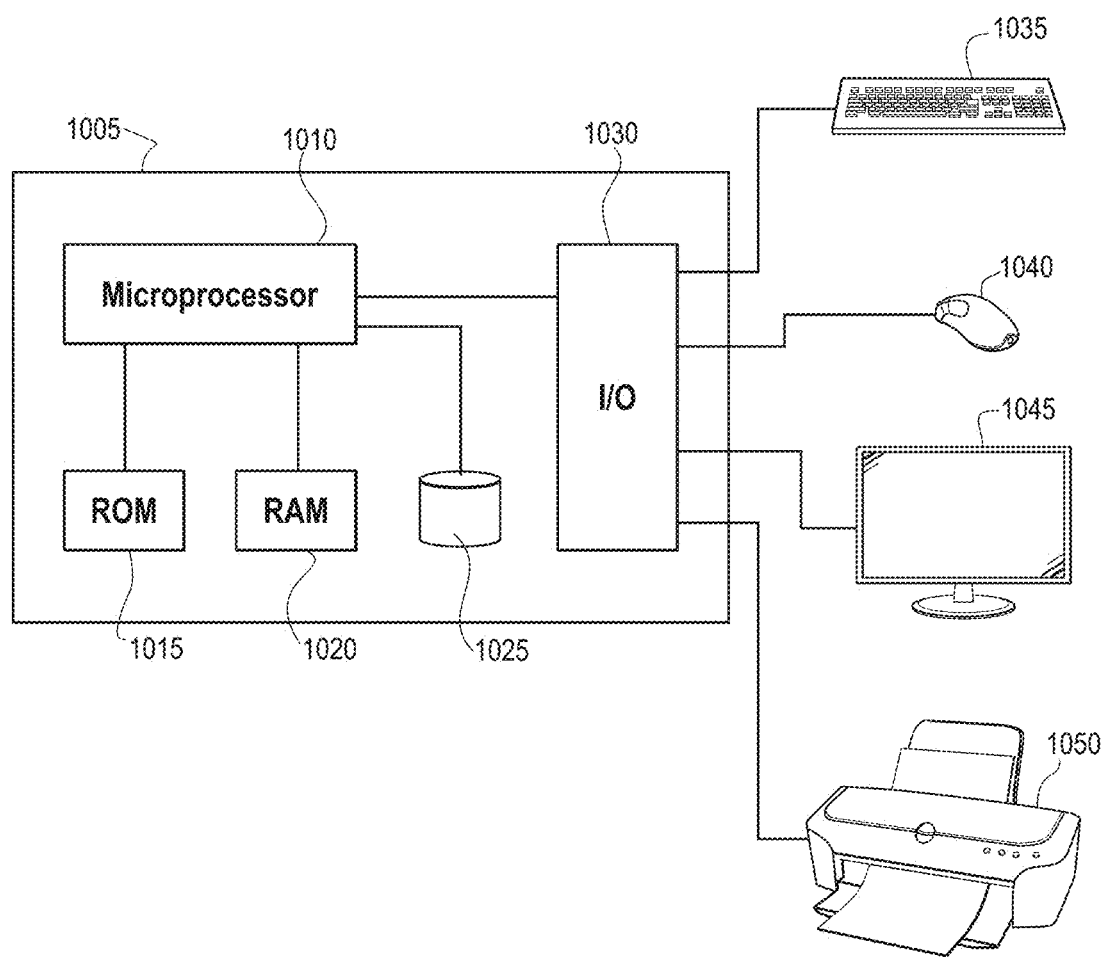
FIG. 10 is a block diagram of a computing system suited for implementing the method in accordance with an embodiment of the present invention.

FIG. 10 is a block diagram of a computing system 1005 suited for implementing the method in accordance with an embodiment of the present invention. The computing system 1005 includes a microprocessor 1010, read-only memory (ROM) 1015, random access memory (RAM) 1020, a hard drive or equivalent 1025, and an input/output (I/O) interface module 1030. The microprocessor 1010 operates under the control of an operating system, normally initially stored in ROM 1015 or hard drive 1025, and stored program instructions which facilitate the execution of the calculations and steps of the exemplary method in accordance with the present invention. One of ordinary skill in the art will understand in general how to display a graphical user interface (GUI) having windows capable of accepting inputs from a user and other windows with indicia/sliders for conveying visual information to the user. Using the information provided by FIGS. 3 and 8, and the corresponding descriptions as a guide, one of ordinary skill in the art using generally known GUI techniques can provide control instructions causing the generation of such an input/output GUI. The instructions/software to execute the steps and computations for the described embodiment of the present invention are well within the skill of one of ordinary skill in the art as guided by the information provided herein.

Peripheral devices include a keyboard 1035 and a mouse 1044 providing an input of data/values and selection of objects. A display device 1045, e.g., an LCD monitor, facilitates the presentation of visual information to the user. It will be understood that one or more display devices may be concurrently utilized, e.g., one display device may be utilized to display the GUI of FIG. 8, while a second display device is used to display the maps in accord with the exemplary method with color-coded information as explained herein. Simultaneously displaying the GUI and the maps with color-coded information makes it easy for the user to relate the color-coded information contained on the GUI with the correspondingly color-coded information on the maps. Those skilled in the art will understand the general principles of displaying images on a screen. Alternatively, a printer 1050 or other device capable of generating a fixed and/or permanent image can be used to store and/or display images of maps. Resulting maps based on one set of parameters can be quickly produced, i.e., under 3 minutes. This allows a mission planner to rapidly generate a series of maps based on different combinations of parameters in order to determine which set of parameters produce the most desirable probabilities of detection for segments of LOC that are of key importance.

The embodiment of the present invention provides an innovation and inventive step in digital imagery providing for a more cost-effective and efficient deployment of aircraft to achieve more success in the acquisition of terrestrial based targets. Although mathematical operations are performed, these only serve as a backdrop for the value associated with the transformed color-coded maps that quickly convey large amounts of specific information to a user about the probabilities of target detection on specific segments of lines of communication. This ability, and the capability to quickly and easily determine results for different parameter values, provides a significant improvement in this field of endeavor.

Although exemplary implementations of the invention have been depicted and described in detail herein, it will be apparent to those skilled in the art that various modifications, additions, substitutions, and the like can be made without departing from the spirit of the invention. For example, if terrain and line of communication data are available in Cartesian coordinates there will obviously be no need to process data from a different format to achieve this type of data. Although it is believed to be beneficial to utilize a sun shaded image to assist in conveying topological terrain, it would still be advantageous to display image differentiated/color-coded lines of communication on a map that is not sun shaded. Alternatively, only the color-coded lines of communication could be displayed, i.e., the lines of communication could be displayed without reference to a terrain map. A different type of line of communication, other than roads, could be selected for observation, e.g., railroad tracks may be of prime interest. Alternatively, two or more different types of lines of communication could be selected. Although specific parameters are indicated for use of a Doppler radar, other types of radar as well as other types of sensors in general could be utilized. Depending on the particular targets of interest, a heat seeking sensor or various types of optical telemetry could be utilized. It will be apparent that the corresponding parameters for different types of sensors will be required as inputs.

The scope of the invention is defined in the following claims.

The invention claimed is:

1. A computer implemented digital image processing method for conveying probabilities of observing lines of communication from an in-flight aircraft comprising the steps of:

generating a geographical terrestrial map with lines of communications disposed thereon;

receiving and storing input data defining an aircraft route relative to the geographical map;

determining for segments of the lines of communication a visibility percentage that each of the segments will have line-of-sight visibility from the aircraft as the latter travels over its entire route;

encoding the segments of the lines of communication with image differentiation to visually differentiate segments with visibility percentage greater than a first set value from segments with visibility percentage less than the first set value;

providing a visual representation of the map with the image differentiated segments.

2. The method of claim 1 further comprising;

dividing the entire route of the aircraft into a plurality of waypoints along the route;

determining at each waypoint for each segment a relative geographical elevation of the segment relative to the position of the aircraft;

determining if line-of-sight visibility for a given segment exists at each waypoint by comparing elevation differences for the given segment at successive waypoints.

3. The method of claim 1 wherein the step of generating a geographical terrestrial map with lines of communications disposed thereon further comprises transforming map coordinates from a geodesic format into coordinates of a Cartesian format.

4. The method of claim 1 further comprising the step of generating sun shading of elevations on the geographical terrestrial map to illustrate a topography with elevation differences, where the sun shading uses a gray scale ranging from white to black indicating always in the sun and never in the sun, respectively, over a time of interest.

5. The method of claim 1 wherein the image differentiation uses color-coding of the segments with first and second colors representing visibility percentage above and below the first set value.

6. The method of claim 5 further comprising the step of generating an input/output graphical interface screen in which the first set value is selectable by the user, the input/output graphical interface screen also displaying a first analog visual gauge where the first analog visual gauge indicates a determination of a visibility percentage greater than the first set value, the first visual gauge having a color corresponding to a first color of segments as displayed on the map with visibility percentage greater than the first set value.

* * * * *